United States Patent [19]

Parkinson et al.

[11] Patent Number: 4,766,337

[45] Date of Patent: Aug. 23, 1988

[54] OPEN DRIP-PROOF MACHINERY COOLING SYSTEM USING TOTALLY ENCLOSED TYPE BEARING BRACKETS

[75] Inventors: David D. Parkinson, West Allis; Gilbert T. Latus, Milwaukee, both of Wis.

[73] Assignee: MagneTek, Inc., Los Angeles, Calif.

[21] Appl. No.: 53,102

[22] Filed: May 21, 1987

[51] Int. Cl.[4] .................................. H02K 9/02
[52] U.S. Cl. ............................... 310/58; 310/63; 310/89
[58] Field of Search ............... 310/62, 63, 64, 58, 310/68 D, 85, 88, 89, 60 R, 90

[56] References Cited

U.S. PATENT DOCUMENTS

| | | | |
|---|---|---|---|
| 1,961,387 | 6/1934 | Pfleger | 310/63 |
| 2,347,517 | 4/1944 | Smalley | 310/63 |
| 2,522,675 | 9/1950 | Hoover | 310/62 |
| 3,021,442 | 2/1962 | Rodak | 310/89 |
| 3,027,470 | 3/1962 | Atherton | 310/63 |
| 3,512,024 | 5/1970 | Papa | 310/60 |
| 3,518,467 | 6/1970 | Wightman | 310/63 |
| 4,275,321 | 6/1981 | Shimamato et al. | 310/63 |

Primary Examiner—Patrick R. Salce
Assistant Examiner—D. L. Rebsch
Attorney, Agent, or Firm—Faegre & Benson

[57] ABSTRACT

An airflow passageway structure for cooling open drip-proof rotating electric machinery utilizes a totally enclosed shaft bearing bracket spaced apart axially from a frame member, and an air inlet ring overlapping the gap between the frame member and the bearing bracket. Incoming cooling air moves axially along the air inlet ring, then moves radially inward between the bearing bracket and frame member. The cooling air then moves past an air deflector, a rotor or shaft mounted fan and finally exits from the machinery at ports located intermediate the ends of the frame member.

21 Claims, 4 Drawing Sheets

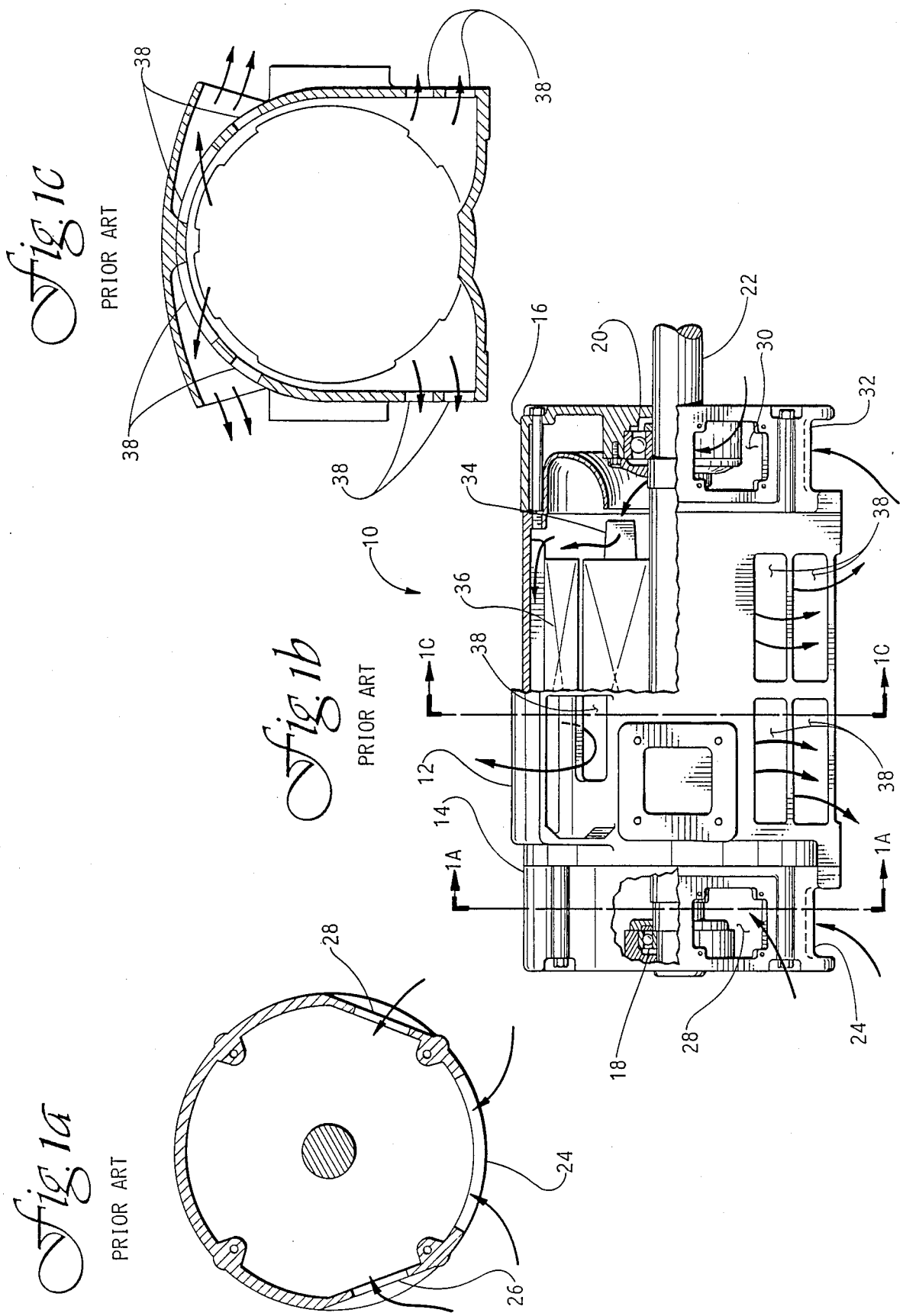

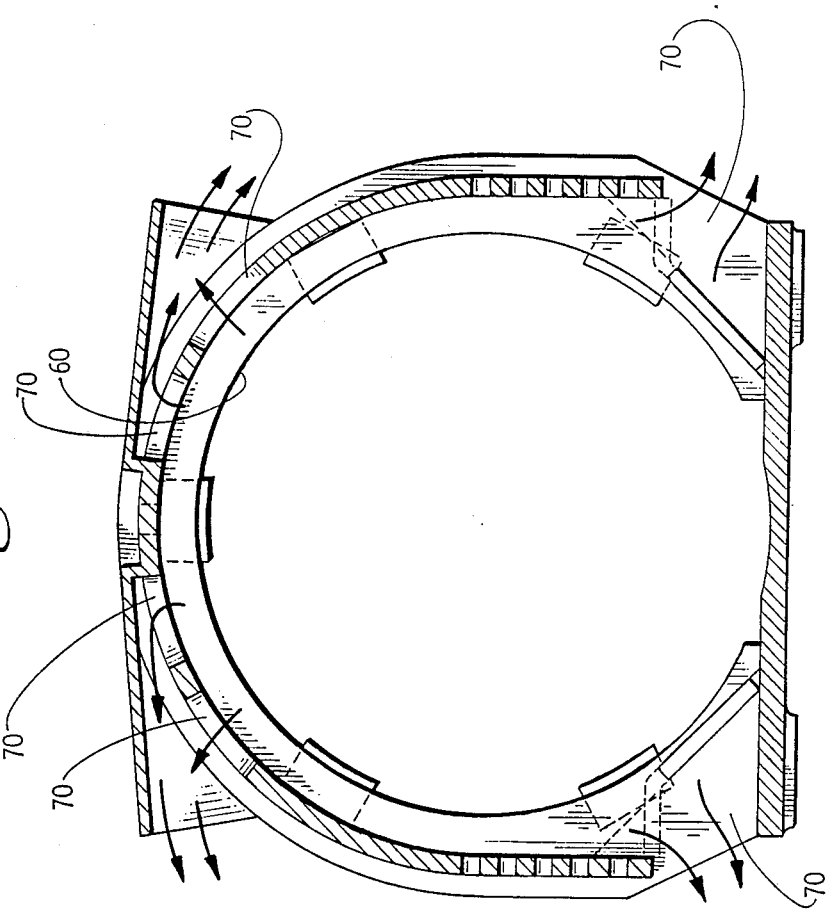
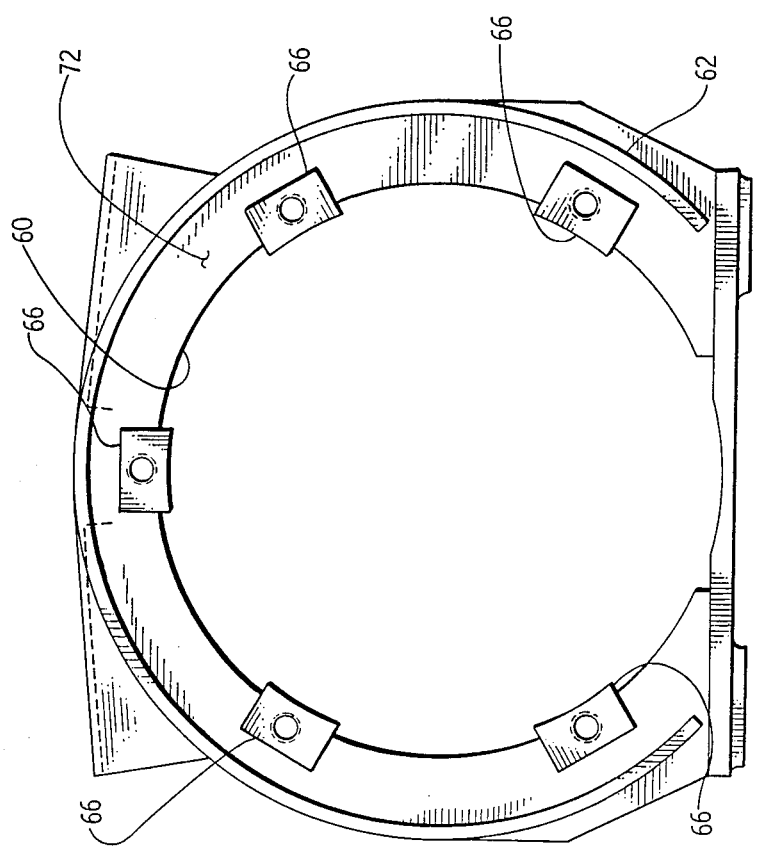

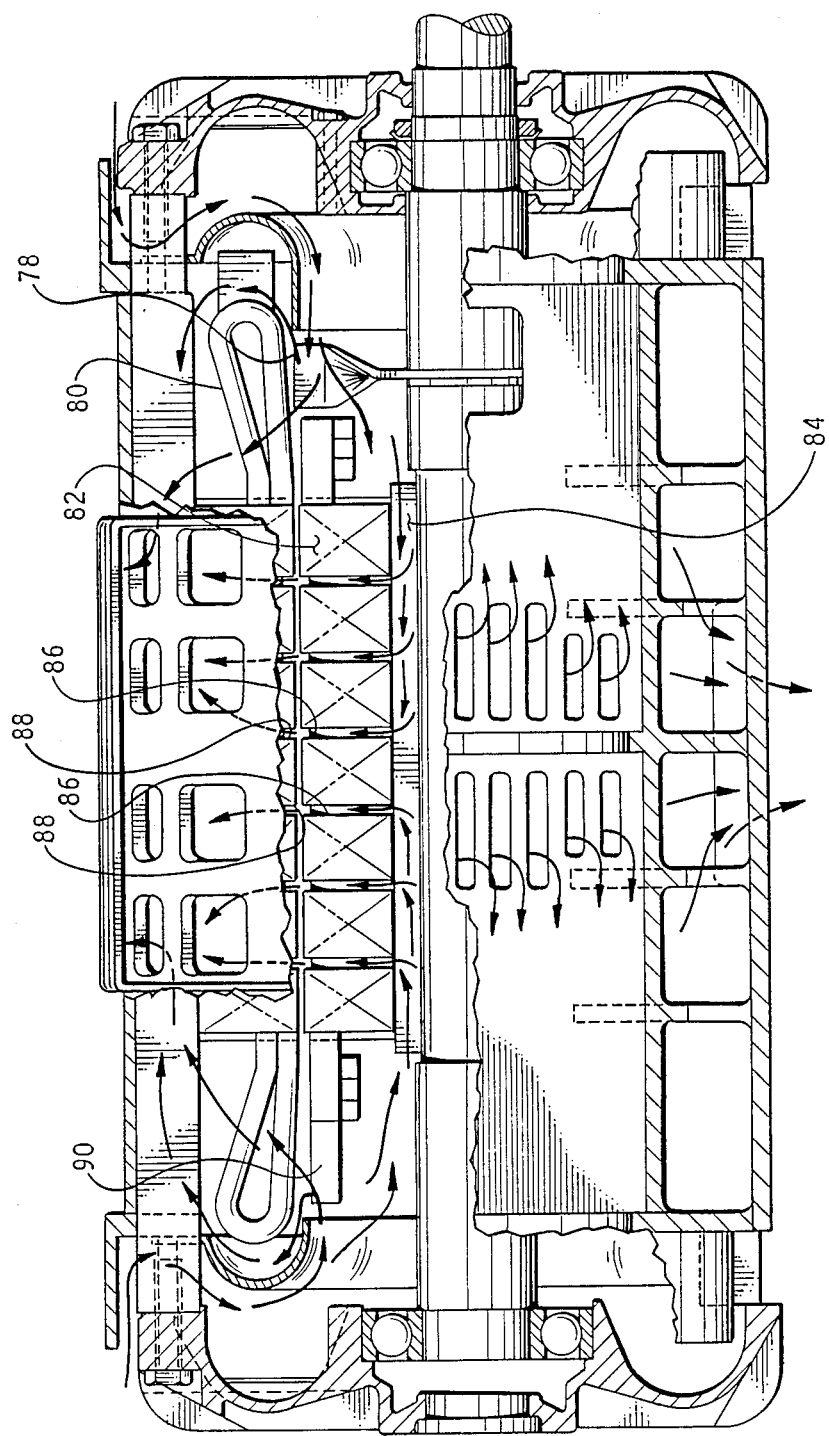

OPEN DRIP-PROOF MACHINERY COOLING SYSTEM USING TOTALLY ENCLOSED TYPE BEARING BRACKETS

BACKGROUND OF THE INVENTION

In the past, housings for rotating electric machinery had utilized a frame and shaft bearing bracket combination to provide an open drip-proof enclosure. In such prior art structures, the frame and shaft bearing brackets were specially designed and suitable only for such open drip-proof applications. A new frame member and new bearing brackets were required when a totally enclosed structure was required. This necessitated a separate inventory of such machinery enclosure parts and resulted in additional cost and complexity for rotating electric machinery manufacturers.

In addition, such open drip-proof structures, particularly in the bearing brackets, had relatively small inlet air apertures, reducing cooling effectiveness. Finally, such prior art inlet apertures conventionally were located below the shaft centerline, often near the base of such machinery when it was mounted for horizontal shaft operation, thus increasing the possibility of contamination of such machinery by dirt or other foreign material resting on the surface on which such machinery was mounted.

The present invention overcomes these disadvantages of the prior art open drip-proof structures by providing for utilization of totally-enclosed type bearing brackets in a new open drip-proof construction which provides for an air inlet aperture permitting the intake of air above the shaft center line. This new construction greatly increases the effective cooling, and reduces the probability of contamination by dirt or other debris resting on the machinery mounting surface in horizontal shaft applications, and reduces the number of parts needed for inventory by allowing the use of totally enclosed bearing brackets in open drip-proof applications. The present invention is useful for any electric machinery which uses cooling air, e.g., motors, generators or electromagnetic clutches or brakes.

BRIEF DESCRIPTION OF THE DRAWINGS

FIG. 1A shows a section end view of a shaft bearing bracket of prior art construction.

FIG. 1B shows a side view of a prior art construction partially cut away to show interior air flow.

FIG. 1C shows a section view of the frame member of FIG. 1B illustrating the exhaust path for cooling air in this prior art structure.

FIG. 2B is an end view of the frame member of FIG. 2A.

FIG. 2C is a section view through the frame member of FIG. 2A showing outlet air pathways.

FIG. 3 is a partial cut away side view of an alternative embodiment of rotating electric machinery illustrating the inlet air flow passageway structure of the present invention.

DETAILED DESCRIPTION

Figure 2A:
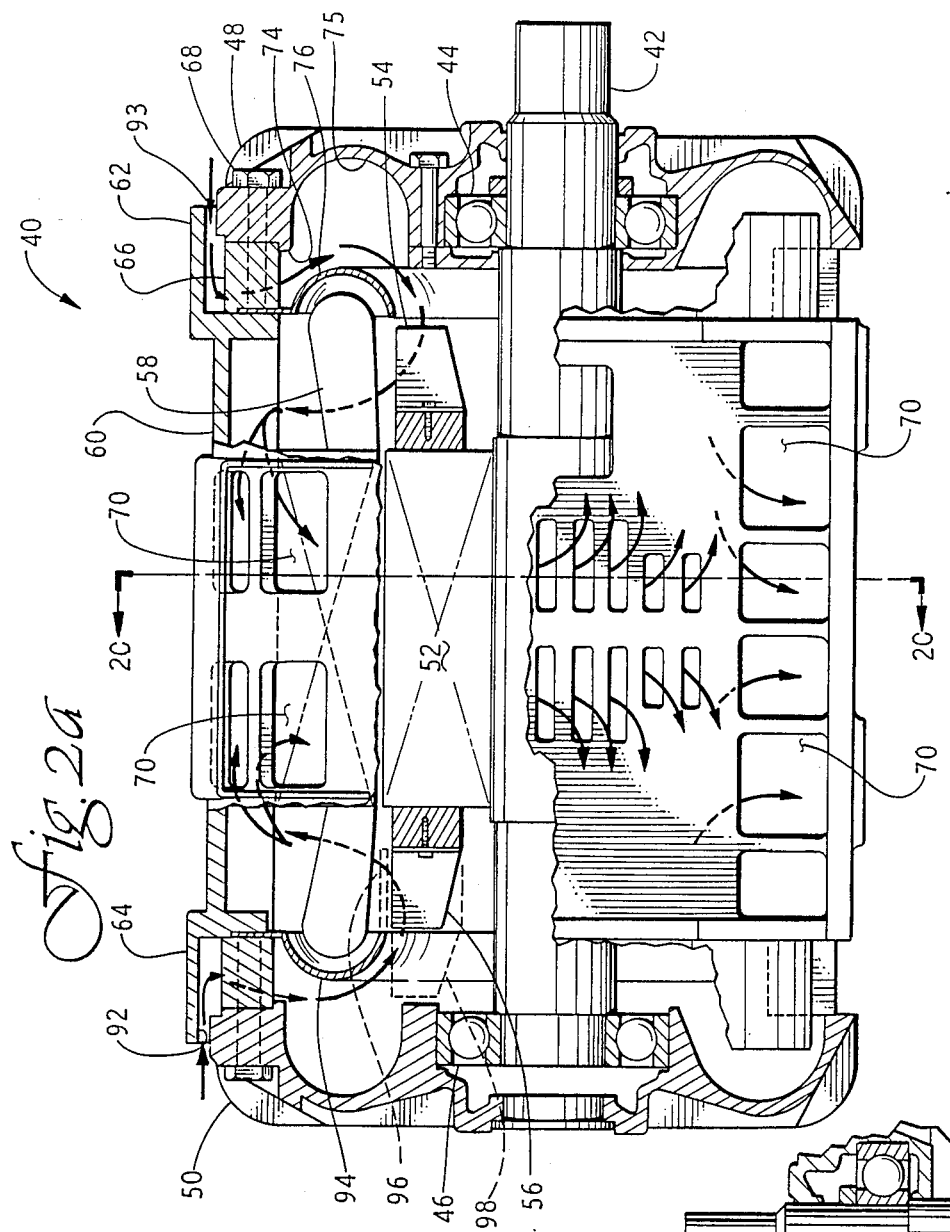
FIG. 2A shows a partial cut away side view of an embodiment of the present invention illustrating the features of the inlet air flow passageway structure.

Referring now more particularly to FIGS. 1A–C, a prior art open drip-proof motor enclosure 10 may be seen. Enclosure 10 has a frame member 12 and a pair of open drip-proof type bearing brackets 14, 16 each respectively carrying a bearing 18, 20 by which a shaft 22 is mounted for rotation within housing or enclosure 10. Air enters enclosure 10 by way of apertures 24–28 in bracket 14, and by way of apertures 30, 32 in bracket 16. After entering enclosure 10, cooling air passes across rotor mounted fan 34, along stator 36, and exits through ports 38.

Referring now to FIGS. 2A–C, an open drip-proof version of rotating electric machinery utilizing the present invention may be seen. FIG. 2A shows a horizontal shaft electric motor 40. Motor 40 has a shaft 42 mounted for rotation by bearings 44, 46 located in bearing brackets 48, 50. A rotor 52 is mounted on shaft 42 for rotation therewith. Rotor 52 carries fans 54, 56 designed to impel air radially toward a stator 58 located on a frame member 60. Frame member 60 has a pair of air flow or inlet rings 62, 64 mounted at opposite ends thereof. Alternatively, single-ended cooling may be accomplished by using an air flow ring at only one end of the machinery enclosure. Ring 62 may be seen in an end view in FIG. 2B. Frame member 60 further has a plurality of lands or spacers 66 upon which bearing bracket 48 is mounted. Bracket 48 is secured to frame member 60 by bolts 68 secured through lands or bosses 66 which may be formed in one piece with frame 10 or which may be separate pieces. Bearing bracket 50 is secured to frame 60 in a similar fashion. Referring now more particularly to both FIGS. 2A and 2C, a plurality of ports 70 are provided to permit the egress of cooling air from motor 40.

In this embodiment, cooling air enters motor 40 between bearing bracket 48 and ring 62 in a generally axial direction. Cooling air next progresses radially inward between surface 72 of frame member 60 and interior surface 74 of bracket 48. Cooling air next passes between a stator shroud or air deflector 76 (formed as a section of a toroidal surface formed of sheet metal, fiberglass or other suitable material) and interior surface 75 of bearing bracket 48. Fan 54 then receives the cooling air flow and directs it radially outward and then generally axially across stator 58. Finally, the cooling air flow exits at ports 70. It is to be understood that fans 54, 56 provide the motive force for cooling air in this design.

Referring now to FIG. 3, an alternative embodiment may be seen. In this embodiment, an optional shaft-mounted fan 78 may be used to direct air to both stator 80 and rotor 82. Rotor 82 has axial passageways 84 and radial passageways 86 for conducting cooling air through rotor 82. Stator 80 also may have radial passageways 88 aligned with radial passageways 86. A rotor mounted fan 90 may be used in place of or in addition to shaft mounted fan 78.

Figure 4:
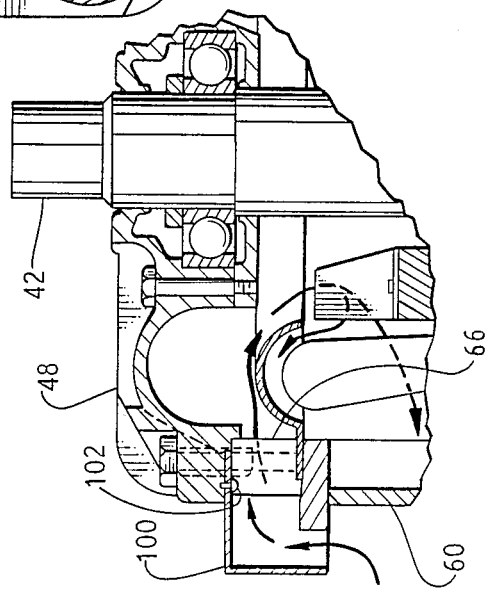
FIG. 4 is a fragmentary view of a still further alternative embodiment showing a structure suitable for vertical shaft mounting.

Referring now to FIG. 4, a still further embodiment suitable for vertical shaft applications may be seen. In this embodiment, ring 62 is omitted from frame member 60'. A drip cover 100 preferably formed of sheet metal may be secured to bracket 48 by drive screws or rivets 102 or, alternatively, may be secured to lands or spacers 66 if desired. Alternatively cover 100 may be cast as a single piece with frame member 60'. In vertical shaft applications the air outlet ports will be made vertically drip-proof by one or more sheltering members such as louvers or awnings, preferably formed of sheet metal in a conventional manner.

The invention is not to be taken as limited to all of the details thereof, as modifications and variations thereof may be made without departing from the spirit or scope of the invention. For example, the air passageway 92 formed between bracket 50 and ring 64 may be made into an air outlet passageway by extending air deflector 94 as shown by the double-dashed lines 96 while at the same time extending fan 56 to the dashed position 98. With such an arrangement ports 70 may be closed off. As a still further alternative ports 70 may be used as air inlets and air passageways 92, 93 as air outlets.

What is claimed is:

1. An improved airflow passageway structure for cooling open drip-proof rotating electric machinery comprising a totally enclosed shaft bearing bracket characterized by the absence of airflow apertures therethrough;

a frame member mounted to and axially spaced apart from said bearing bracket forming a radially oriented aperture; and an axially projecting airflow ring spaced radially outwardly from said radially oriented aperture and secured to the assembly of said bearing bracket and said frame member to admit external cooling air to the interior of said machinery.

2. The structure of claim 1 wherein said air flow ring overlaps the radially oriented aperture between said bearing bracket and said frame member by a length sufficient to prevent ingress of vertically falling liquid into said machinery.

3. The structure of claim 1 wherein said radially oriented aperture extends circumferentially around a majority of the periphery of said frame member.

4. The structure of claim 1 wherein said passageway further comprises a generally axially oriented aperture disposed radially inward of said air flow ring and upstream of said radially oriented aperture.

5. The structure of claim 4 wherein said bearing bracket is mounted to said frame member by circumferentially spaced apart lands located axially between said bearing bracket and said frame member.

6. The structure of claim 5 wherein a first portion of said radially oriented aperture is formed by opposed surfaces on said bearing bracket and said frame member axially spaced apart by said lands.

7. The structure of claim 6 wherein said first portion of said radially oriented aperture is a generally arcuate aperture interrupted by said lands.

8. The structure of claim 1 wherein said machinery has rotating components, said generally radially oriented aperture further comprising a second portion disposed radially inward and in series with said first portion and carrying cooling air propelled by a fan mounted on one of said rotating components.

9. The structure of claim 8 wherein said one rotating component is a rotor.

10. The structure of claim 8 wherein said one rotating component is a shaft.

11. The passageway of claim 8 wherein said second portion of said radially oriented aperture is further formed by generally radially oriented and spaced apart surfaces of said bearing bracket and an air deflector.

12. The structure of claim 11 wherein said air deflector is a toroidal section.

13. In open drip-proof rotating electric machinery of the type having a frame member carrying a stator and further having a pair of totally enclosed bearing brackets carrying a rotor, an improved inlet air flow passageway structure comprising an air inlet ring located at an axial end of said frame member radially spaced outwardly of and axially overlapping one of said bearing brackets to form an axially oriented air inlet aperture which permits passage of external cooling air to the interior of said frame member and totally enclosed bearing brackets of said machinery.

14. An improvement for double-ended air ventilation of open drip-proof rotating electric machinery comprising:
a. a pair of rings forming axial extensions of a motor frame member at opposite axial ends thereof; and
b. a pair of totally-enclosed shaft bearing brackets, each:
(i) disposed at an axial end of said frame member, and
(ii) spaced radially inwardly of said rings to form axially oriented air inlet apertures for passage therebetween of external cooling air entering the interior of said machinery.

15. The passageway structure of claim 13 wherein said air inlet aperture extends around greater than fifty percent of the bearing bracket circumference.

16. The passageway structure of claim 13 further comprising a generally radially oriented aperture formed by spacing means positioned axially between said frame member and said one bearing bracket, said radially oriented aperture positioned radially inwardly of said air inlet ring and downstream of said air inlet aperture.

17. The passageway structure of claim 16 wherein said spacing means comprise a plurality of mounting bosses located axially between said frame member and said one bearing bracket at the circumference of said one bearing bracket.

18. The improvement of claim 14 wherein at least one of said axially oriented apertures is an air inlet aperture.

19. The improvement of claim 14 wherein each of said bearing brackets is axially spaced from said frame member interiorly of said rings to form generally radially oriented apertures interior of said axially oriented apertures.

20. The improvement of claim 19 wherein said generally radially oriented apertures are further formed by generally axially spaced apart surfaces of a pair of air deflectors and the interior of said bearing brackets.

21. The improvement of claim 20 wherein said machinery includes a shaft mounted for rotation in said bearing brackets and said generally radially oriented apertures direct incoming cooling air to at least one fan mounted for rotation with said shaft.

* * * * *